United States Patent
Seegel

(10) Patent No.: US 12,179,443 B2
(45) Date of Patent: Dec. 31, 2024

(54) METHOD AND TOOL SYSTEM FOR MANUFACTURING A COMPONENT FROM A FIBER-REINFORCED PLASTIC

(71) Applicant: Airbus Operations GmbH, Hamburg (DE)

(72) Inventor: Hauke Seegel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 62 days.

(21) Appl. No.: 17/536,052

(22) Filed: Nov. 28, 2021

(65) Prior Publication Data

US 2022/0152952 A1   May 19, 2022

Related U.S. Application Data

(63) Continuation of application No. PCT/EP2020/069937, filed on Jul. 15, 2020.

(30) Foreign Application Priority Data

Jul. 30, 2019   (DE) .................... 10 2019 120 568.9

(51) Int. Cl.
*B29C 70/48*   (2006.01)
*B29C 33/38*   (2006.01)
(Continued)

(52) U.S. Cl.
CPC .......... *B29C 70/48* (2013.01); *B29C 33/3828* (2013.01); *B29C 33/405* (2013.01); *B29C 70/443* (2013.01); *B29K 2995/0012* (2013.01)

(58) Field of Classification Search
CPC ................ B29C 70/48; B29C 33/3828; B29C 2043/3261; B29C 66/8284
See application file for complete search history.

(56) References Cited

U.S. PATENT DOCUMENTS

| 5,565,162 A * | 10/1996 | Foster | .................. B29C 70/443 264/258 |
| 2007/0007692 A1* | 1/2007 | Lehmann | ................ C08L 65/00 264/299 |

(Continued)

FOREIGN PATENT DOCUMENTS

| DE | 10 2010 038 115 A1 | 4/2012 |
| DE | 10 2011 077 468 A1 | 12/2012 |

(Continued)

OTHER PUBLICATIONS

Mccaffery, Timothy et al, "Low Cost Mold Development for Prototype Parts Produced by Vacuum Assisted Resin Transfer Molding (VARTM)," Journal of Composite Materials, Oct. 31, 2003.

(Continued)

*Primary Examiner* — Matthew J Daniels
(74) *Attorney, Agent, or Firm* — KDW Firm PLLC

(57) ABSTRACT

A method for producing a component from a fiber-reinforced plastic, wherein at least one ply of a semifinished fiber product having a peripheral contour is applied to the molding tool at a first temperature, wherein the contour lies within the peripheral edge. A compensating body, having a coefficient of thermal expansion which is greater than a coefficient of thermal expansion of the molding tool, is arranged along the peripheral edge, such that the compensating body extends from the edge in the direction of the peripheral contour. After sealing the arrangement, resin is introduced, and the arrangement is heated. As a result, the compensating body expands to a greater extent than the molding tool and encloses the semifinished fiber product in a flush manner, with the result that a shape of the component can correspond to an intended final shape and no longer has to be finish-machined.

5 Claims, 3 Drawing Sheets

(51) Int. Cl.
    *B29C 33/40*     (2006.01)
    *B29C 70/44*     (2006.01)

(56) References Cited

U.S. PATENT DOCUMENTS

2011/0272853 A1\* 11/2011 Tsuji ..................... B29C 70/48
                                                                                           264/257
2016/0052182 A1     2/2016 Koga et al.
2019/0299493 A1\* 10/2019 Provost .............. B29C 33/0038

FOREIGN PATENT DOCUMENTS

| | | |
|---|---|---|
| DE | 10 2012 206 386 A1 | 10/2013 |
| DE | 10 2012 110 353 A1 | 4/2014 |
| DE | 10 2013 012 005 A1 | 1/2015 |
| DE | 10 2015 00 7284 A1 | 12/2016 |
| DE | 10 2016 120 684 A1 | 5/2018 |
| EP | 0780213 A1 | 6/1997 |
| EP | 2324995 A1 | 5/2011 |
| WO | WO-2018011528 A1 \* 1/2018 ......... B29C 33/0038 |

OTHER PUBLICATIONS

German Search Report for Application No. 102019120568 dated Jan. 4, 2020.
International Search Report for Application No. PCT/EP2020/069937 dated Sep. 16, 2020.

\* cited by examiner

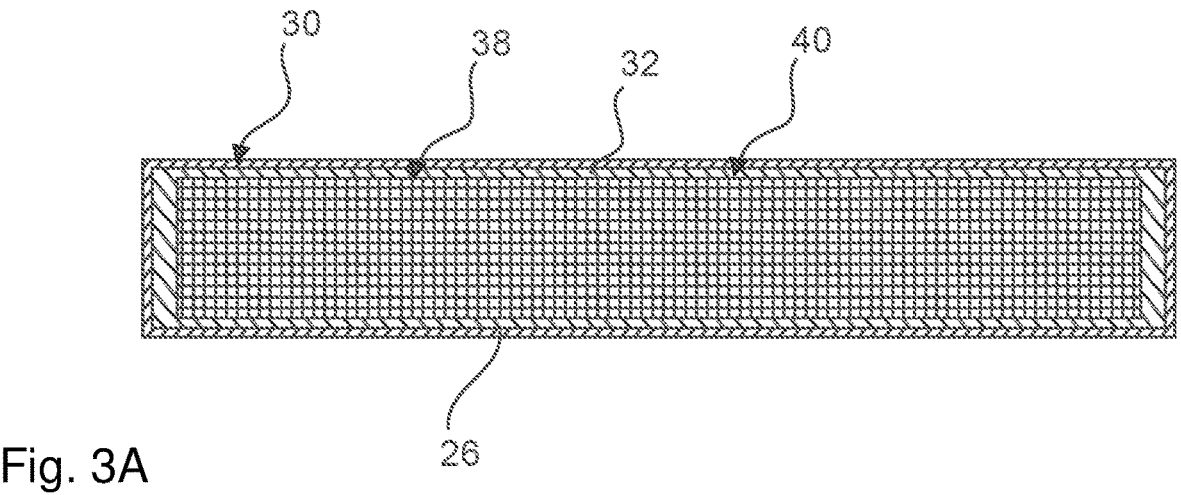
Fig. 3A
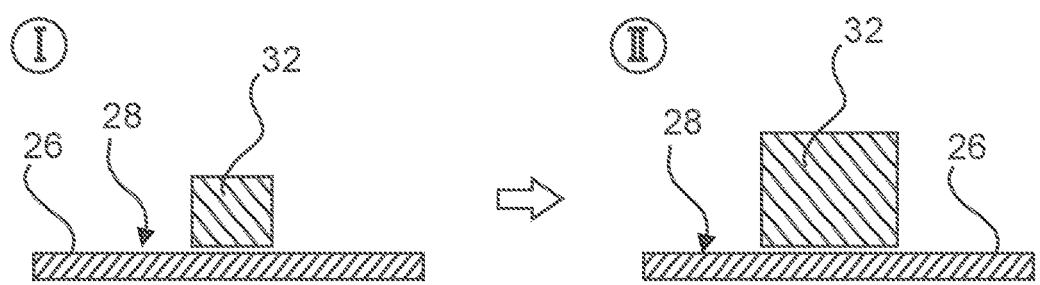
Fig. 3B
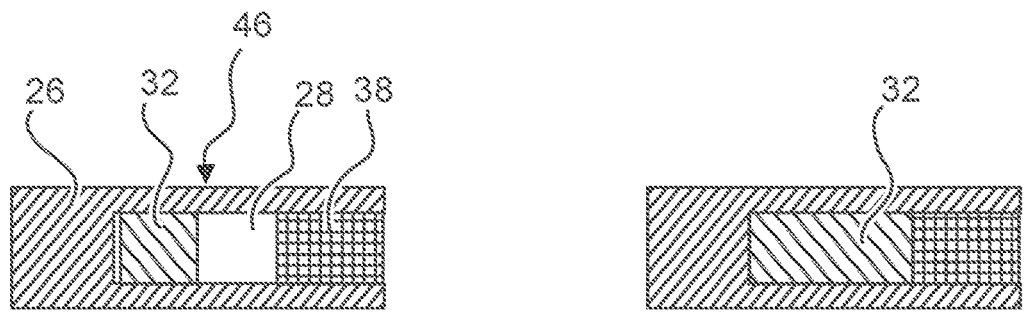
Fig. 3CFig. 3D

METHOD AND TOOL SYSTEM FOR MANUFACTURING A COMPONENT FROM A FIBER-REINFORCED PLASTIC

CROSS-REFERENCE TO RELATED APPLICATIONS

This application is a continuation of and claims priority to Application No. PCT/EP2020/069937 filed Jul. 15, 2020, which claims priority to German Patent Application No. DE 10 2019 120 568.9 filed Jul. 30, 2019, the entire disclosures of which are incorporated by reference herein.

TECHNICAL FIELD

The disclosure herein relates to a method for producing a component from a fiber-reinforced plastic, and to a tool system for producing a component of this type.

BACKGROUND

Various methods are known for the production of large-format components from a fiber composite material. Injection molding methods or vacuum infusion methods are predominantly used. In principle, in both methods, use is made of molding tools which determine the shape of the component to be produced and are provided with one or more plies of a semifinished fiber product. After the mold has been closed, the plies in the mold are impregnated with resin and then cured. Depending on the method used, excess pressure or a vacuum is used.

It is precisely in the production of relatively large components that large-format molding tools are required. However, in conventional resin systems, depending on the application, a certain temperature is desirable for the adequate impregnation of the semifinished fiber product with resin and the subsequent crosslinking of the resin in order to achieve the required properties of the resulting component. Given a certain coefficient of thermal expansion, it is inevitable that the molding tool will expand during heating in the case of customary materials for the molding tools. Since the molding tool determines the subsequent shape of the component produced and the thermal expansion behavior may deviate from that of the tool material, deviations may therefore occur on account of the thermal expansion. In order to avoid these and any resulting damage during removal from the mold, the components are often produced in an oversize and are then brought to the desired size by machining. Alternatively, it would be possible to use expensive and/or difficult-to-machine tool materials which have a significantly lower thermal expansion behavior. As a further alternative, it would be possible to use complex, multi-part molding tools which are equipped with, in some cases, complex movement or demolding mechanisms. This increases both the effort and the costs, precisely in the production of components from a carbon fiber-reinforced plastic.

SUMMARY

It is therefore an object of the subject matter herein to disclose a method which allows a component to be produced as accurately as possible with a predetermined dimension without expensive finish machining being necessary.

The object is achieved by a method disclosed herein. Advantageous embodiments and developments are disclosed herein.

The proposal is for a method for producing a component from a fiber-reinforced plastic, having the steps of providing a molding tool with a tool surface having a peripheral edge, positioning at least one ply of a semifinished fiber product, having a peripheral contour which lies within the peripheral edge, on the tool surface at a first temperature, arranging a compensating body, having a coefficient of thermal expansion which is greater than a coefficient of thermal expansion of the molding tool, along the peripheral edge, such that the compensating body extends from the edge in the direction of the peripheral contour, sealing the arrangement of the at least one ply and of the compensating body by a closure device to form a closed mold, heating the mold, with the result that the compensating body expands to a greater extent than the mold, introducing resin into the mold, and curing, cooling, and removing the component.

In particular, the method can be implemented as a resin transfer molding (RTM) method. For this purpose, the at least one ply of the semifinished fiber product is provided, which is sealed all around on the molding tool with the aid of the closure device. While flexible sheets would be conceivable, the use of a further, hard molding tool section, which is placed over the semifinished fiber product, is particularly suitable in this method. One goal is to enclose the at least one ply in an airtight and shape-retaining manner on the molding tool.

When the RTM method is carried out, a pressurized supply of resin can follow in order to infiltrate the at least one ply of the semifinished fiber product. As an alternative to this, evacuation of the mold would also be possible, resin thereby being drawn into the mold as a result of the vacuum.

The at least one ply of the semifinished fiber product is located on the molding tool and has a peripheral contour which, when viewed from the component to be produced, encloses a gap with respect to the peripheral edge of the tool surface. This serves to accommodate the compensating body which, according to the disclosure herein, has the property of having a coefficient of thermal expansion which is greater than a coefficient of thermal expansion of the molding tool. The coefficient of expansion is to be understood to mean the coefficient of linear expansion. This means that, when the mold with at least one ply of the semifinished fiber product contained therein is heated, both the molding tool and the compensating body expand. During this process, the compensating body expands to a greater extent than the molding tool in order to close a gap which is still enclosed with respect to the peripheral contour after the compensating body has been deposited. The compensating body is preferably dimensioned in such a way that it is flush with the semifinished fiber product at elevated temperature and seals the latter completely on the contour side. As a particular preference, the compensating body should be dimensioned in such a way that it forms a resin edge corresponding to the tolerances.

In this case, the peripheral edge of the tool surface and the peripheral contour of the at least one ply of the semifinished fiber product can be selected in such a way that, in the event of a selective increase in the temperature to improve the flowability of the resin, there remains a sufficient gap between the contour and the edge, through which gap the resin can move into the semifinished fiber product from one or more resin introduction points in the closed mold.

In one case, the molding tool could consist of an aluminum alloy. This has a coefficient of linear expansion in the range of approximately 22 to $24 \cdot 10^{-6}$ K$^{-1}$. The compensating body could consist of a plastic, PTFE or the like for instance, or a rubber-like material, for example. PTFE could have a coefficient of linear expansion of from 100 to $160 \cdot 10^{-6}$ K$^{-1}$, that is to say an approximately 5- to 7-fold value. Reliable expansion of the compensating body in the interior of the closed mold to close an interspace between the peripheral edge and the peripheral contour can thus be achieved as the mold expands.

In the sense according to the disclosure herein, the term "resin" is intended to denote any matrix material which is suitable for the formation of a fiber composite component with a fiber material. In this case, the matrix material can also already contain a curing agent (multi-component resin system). In the narrower sense, resin can refer to thermosetting plastics, e.g. epoxy resin systems. However, thermoplastics should not be excluded either.

Furthermore, the compensating body is to be understood as a component which serves primarily to compensate for the thermal expansion of the molding tool. It is located flush in the interspace between the peripheral edge and the peripheral contour, at least at the temperatures at which the resin crosslinks. As an option, it is also possible in addition for the compensating body to be used for sealing the molding tool. However, it is conceivable for an additional peripheral seal to be arranged on the outside at the edge of the molding tool. The compensating body can be shaped in the form of a strip and, as a result, has a length which significantly exceeds the width. The compensating body could then be placed manually or automatically in the desired manner. As an alternative, it is expedient to embody the compensating body as one or more plates which provide the desired shape of the compensating body.

In a particularly advantageous embodiment, heating the mold comprises heating from the first temperature to a second temperature, which is in a range of from 70° C. to 150° C. Furthermore, it can also lie in a range whose lower limit is higher, for example 90° C. Moreover, the upper limit could be slightly higher or lower. By heating to the second temperature in the temperature range mentioned, the flowability of the resin can be improved. In addition, initial crosslinking of the resin can take place at the second temperature. The heating of the mold to such a temperature is often carried out in RTM methods for producing CFRP components. When heating to the second temperature, an initial linear expansion of the molding tool takes place. However, the linear expansion of the compensating body clearly exceeds this. As a result of the greater expansion of the compensating body, an interspace between the edge and the peripheral contour of the semifinished fiber product is at least partially closed. In this process, resin is displaced from this interspace.

It is advantageous if the method furthermore comprises heating to a third temperature for curing, which is in a range of from 150° C. to 200° C. Heating to the third temperature, which could be approximately 180° C., for example, leads to complete curing of the resin, the component thus acquiring its final strength.

It is pointed out that the interaction between the expanding compensating body and the molding tool should be precisely matched. When heated from the first temperature to the third temperature, the molding tool expands continuously. During the heating phase, there may be a limit temperature at which the molding tool exactly matches the predetermined shape. At the same time, the semifinished fiber product in combination with the resin contained therein continuously increases in strength, at least from a certain temperature, until the final strength is reached. Accordingly, it would be possible, for instance, for the compensating body to be dimensioned in such a way that, at a specific limit temperature, the interspace between the peripheral edge and the peripheral contour is exactly closed by expansion of the compensating body, and the partially crosslinked resin contained in the semifinished fiber product brings about such a dimensional stability that, upon further heating of the molding tool and the further expansion caused thereby, the semifinished fiber product is not deformed further. Such a limit temperature could lie between the second and the third temperature. A holding stage at this limit temperature allows crosslinking up to contour accuracy before stronger heating takes place in order to increase the final strength. It is therefore sensible to test and coordinate the required dimensions of the compensating body, either experimentally or by simulation, depending on the material.

The compensating body could preferably be dimensioned so as to be narrower at longitudinal edges than at transverse edges of the molding tool before being arranged on the molding tool. The expansion of the molding tool is dependent on its extent. If, for example, the length of the molding tool is significantly greater than its width, a significantly greater linear expansion is to be expected in the longitudinal direction than in the transverse direction. Consequently, it makes sense to use narrower compensating bodies at the longitudinal edges than at the transverse edges. It is conceivable that the width of the compensating body is adapted to the respective extent of the molding tool. Consequently, the compensating body is shaped to match the geometrical requirements of the component. If, for instance, the width of the component varies, the width of the compensating body could also be locally adapted in each case.

It is furthermore advantageous if the compensating body is dimensioned in such a way that, at the first temperature, there is a gap between the compensating body and the at least one ply of the semifinished fiber product, and the compensating body closes up to the at least one ply of the semifinished fiber product only after the heating and before the introduction of resin. Closing up should be understood to the effect that the compensating body rests flush against the peripheral contour of the semifinished fiber product. Resin can thereby be prevented from escaping via the peripheral contour of the semifinished fiber product. Provision can be made for localized gaps to be left in the compensating body, which gaps do not close until the temperature is increased beyond the second temperature, for example, so as to leave open a suitable point for introducing resin there.

The molding tool preferably has a coefficient of thermal expansion of at most $30 \cdot 10^{-6}$ K$^{-1}$, and the compensating body has a coefficient of thermal expansion of at least $100 \cdot 10^{-6}$ K$^{-1}$. In this way, a significant difference between the two coefficients of expansion is produced. The quotient of the coefficient of thermal expansion of the compensating body and of the molding tool can be significantly greater than 3.

The disclosure herein further relates to a tool system for producing a component from a fiber-reinforced plastic, having a molding tool with a tool surface having a peripheral edge, a compensating body having a coefficient of thermal expansion which is greater than a coefficient of thermal expansion of the molding tool, a closure device which is shaped so as to correspond to the molding tool, and a heating device for the requisite heating of the molding tool, wherein the tool surface is designed to receive, at a first temperature, at least one ply of a semifinished fiber product having a peripheral contour which lies within the peripheral edge, and also of the compensating body along the peripheral edge, such that the compensating body extends from the edge in the direction of the peripheral contour, wherein the closure device is designed to close the molding tool to form a closed mold and, at the same time, to enclose the at least one ply of the semifinished fiber product and the compensating body, and wherein the closed mold has at least one resin conduit for receiving resin.

The compensating body can be flexible. This can be expedient if the compensating body is placed successively along its desired extent on the molding tool by a manual or automated method. The compensating body could then be capable of being rolled up in an appropriate manner. It should be noted here, however, that such placing is particularly preferred in the case of molding tools in which there are no sharp changes in width.

It could make sense for the compensating body to be shaped like a strip. This could simplify the placement of the compensating body on the molding tool.

In this case, the molding tool could have a coefficient of thermal expansion of at most $30 \cdot 10^{-6}$ $K^{-1}$, and the compensating body could have a coefficient of thermal expansion of at least $100 \cdot 10^{-6}$ $K^{-1}$.

It is useful with regard to material and production costs if the molding tool comprises aluminum. Molding tools made of aluminum are particularly suitable for the production of relatively large components since the tool surface can easily be machined and they are significantly more expensive than metallic materials having a similar temperature stability and a significantly lower coefficient of expansion.

It is furthermore conceivable for the molding tool to comprise an iron-containing alloy. This can be embodied, for example, as steel, e.g. cast steel. It is furthermore conceivable to use iron-nickel alloys, which are also known under the name INVAR and can have a particularly low coefficient of thermal expansion.

Furthermore, the tool can also comprise CFRP.

It is furthermore preferred if the compensating body comprises PTFE or rubber. A very high coefficient of thermal expansion can thereby be achieved.

BRIEF DESCRIPTION OF THE DRAWINGS

Further features, advantages and possible applications of the disclosure herein will be found in the following description of the example embodiments and the figures. In this context, all the features described and/or illustrated graphically form the subject matter of the disclosure herein in themselves and in any desired combination, irrespective of their combination in the individual claims or the dependency references thereof. In the figures, the same reference signs are furthermore used for identical or similar objects.

FIGS. 3A, 3B, 3C and 3D show details of compensating bodies in the molding tool.

DETAILED DESCRIPTION

Figure 1:
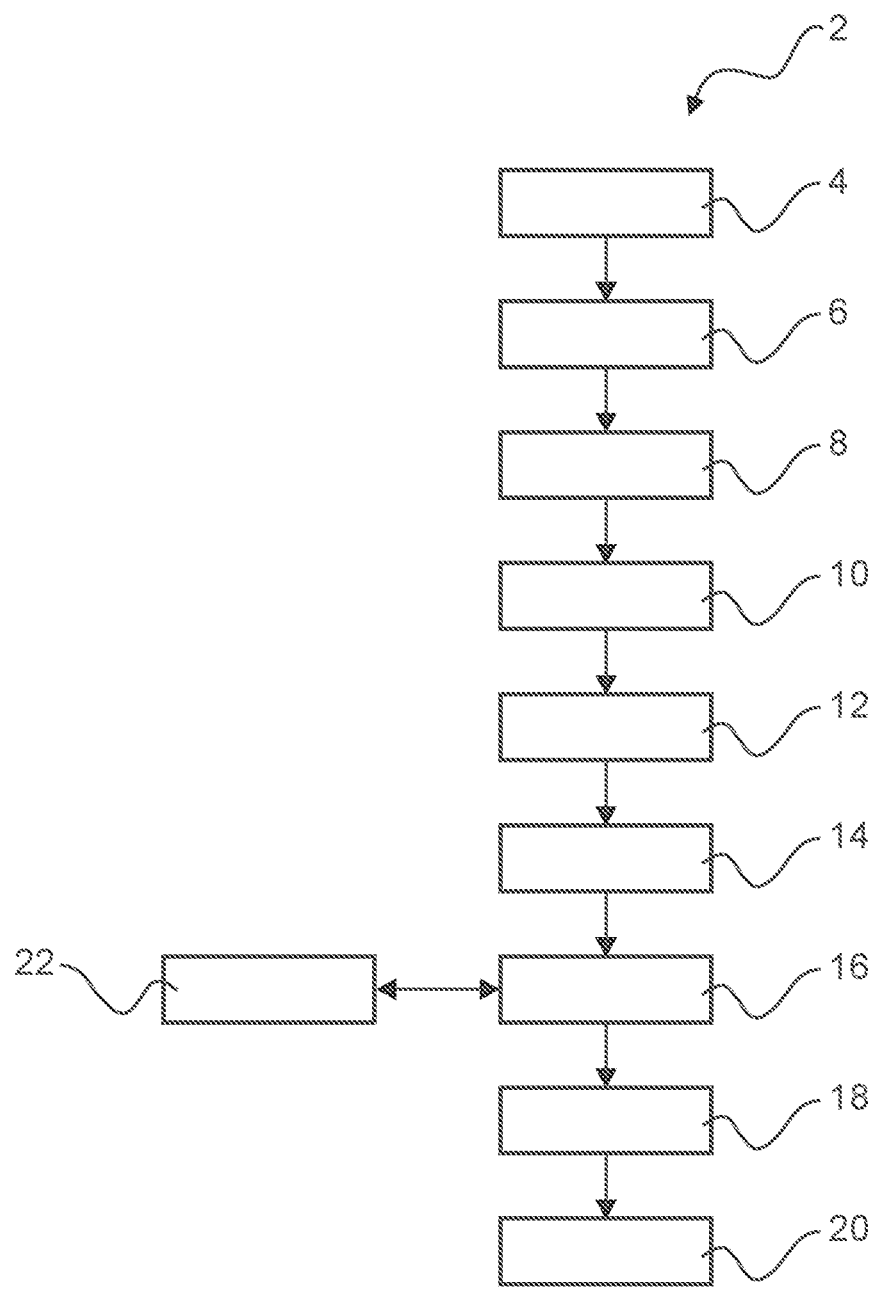
FIG. 1 shows a schematic block-based illustration of a method.

FIG. 1 shows a schematic block-based illustration of a method 2 according to the disclosure herein for producing a component from a fiber-reinforced plastic. The method 2 has the steps of providing 4 a molding tool with a tool surface having a peripheral edge, of positioning 6 at least one ply of a fiber tool, having a peripheral contour which lies within the peripheral edge, on the tool surface at a first temperature, of arranging 8 a compensating body, having a coefficient of thermal expansion which is greater than a coefficient of thermal expansion of the molding tool, along the peripheral edge, such that the compensating body extends from the edge in the direction of the peripheral contour. Subsequently, the sealing 10 of the arrangement of the at least one ply and of the compensating body by a closure device to form a closed mold, the heating 12 of the mold, with the result that the compensating body expands to a greater extent than the mold, the introduction 14 of resin into the mold, curing 16, cooling 18, and removal 20 are performed. Heating may comprise heating to a second temperature, which may be in a range of from 90° C. to 150° C. After introduction 16, heating 22 to a third temperature in a range of from 150° C. to 200° C. can be provided for the purpose of curing 18.

Figure 2A:
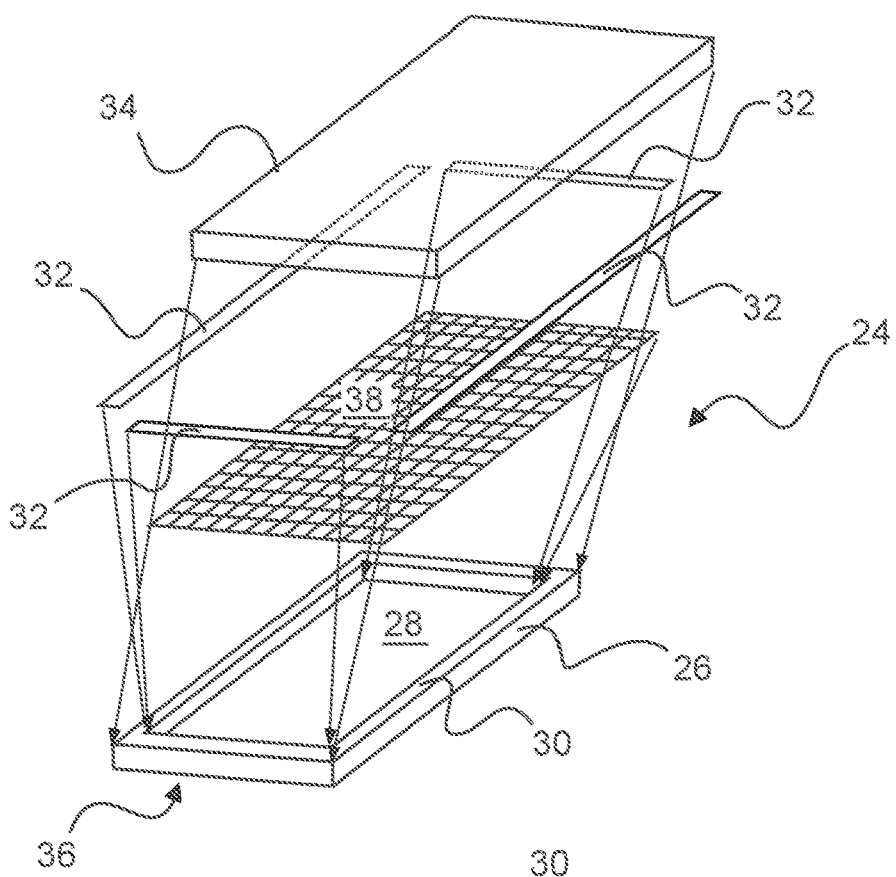
FIGS. 2A, 2B and 2C show a tool system in several three-dimensional views.
Figure 2B:
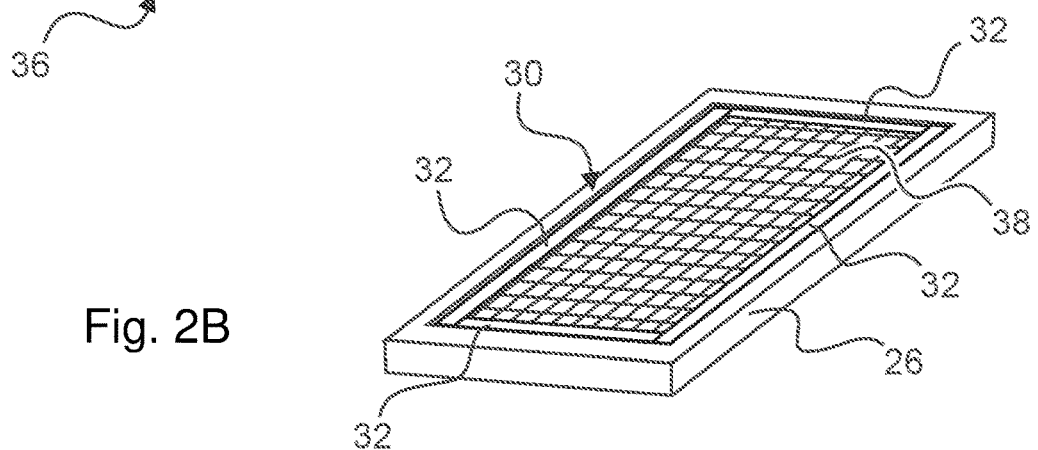

FIG. 2A shows, in a very schematic illustration, a tool system 24 according to the disclosure herein, which makes possible the method 2 illustrated above. The tool system 24 has a molding tool 26 with a tool surface 28, which has a peripheral edge 30. In addition, a plurality of compensating bodies 32, which, by way of example, are shaped in the manner of strips, are provided. While the molding tool 26 could be produced from aluminum, for example, the compensating bodies 32 preferably comprise a plastics material, such as PTFE, for example, or a rubber material. The material of the compensating bodies 32 could be rigid or flexible. The use of a flexible material could facilitate automated application if this is desired. According to the disclosure herein, the coefficient of thermal expansion of the compensating body 32 is significantly higher than that of the molding tool 26.

Furthermore, a closure device 34 is provided, which is designed to be complementary to the molding tool 26. The closure device 34 can be pressed onto the molding tool 26 by a screw connection or an external movement or holding device. A heating device 36 is shown merely as a reference sign under the molding tool 26. The heating device 36 could be provided both in the molding tool 26 and in the closure device 34, in both of these elements or externally thereto, and serves for heating the molding tool 26 as required.

The tool surface 28 is designed to receive a ply of a semifinished fiber product 38 at a first temperature, which is, for example, room temperature (approximately 20° C.). This has a peripheral contour 40. When the semifinished fiber product 38 lies on the tool surface 28, the peripheral contour 40 lies within the peripheral edge 30, and consequently there is a gap. The compensating bodies 32 then rest on the molding tool on the tool surface 28 and preferably adjoin the edge 30 in a flush manner.

Figure 2C:
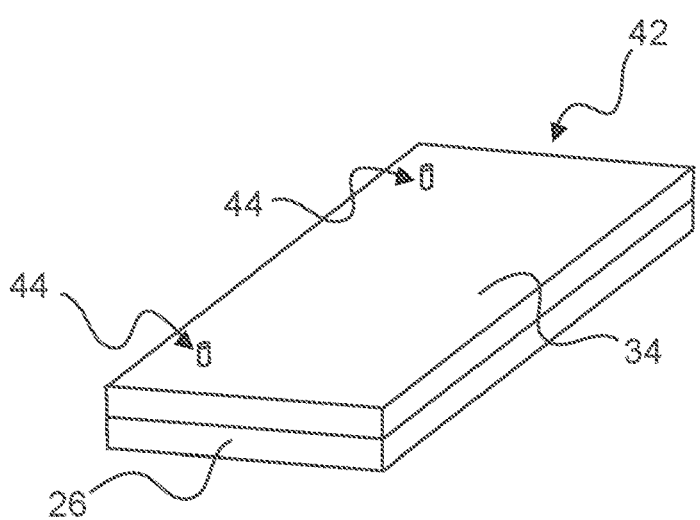

The closure device 34 is furthermore designed to close the molding tool 26 to form a closed mold 42 (see FIG. 2C), and in the process to enclose both the semifinished fiber product 38 and the compensating bodies 32 and absorb the process forces. The latter result from a resin pressure and a thermal expansion pressure. Thereafter, resin can be introduced into the mold 42 via certain resin inlets 44, thus infiltrating the semifinished fiber product 38.

As illustrated above, particular attention is paid to the coefficient of thermal expansion of the molding tool 26 and of the compensating bodies 32. This becomes particularly clear from the further illustrations.

FIG. 3A, for instance, shows the molding tool 26 with the semifinished fiber product 38 located thereon and a compensating body 32, which is arranged on the peripheral edge 30 and extends in the direction of the peripheral contour 40 of the semifinished fiber product 38. This could be, for example, a wing shell which has an elongate shape.

In FIG. 3B, the molding tool 26 is shown in a partial view I at the first temperature, at which the semifinished fiber product 38 is laid on the tool surface 28. Here, the compensating body 32 is in a state of low expansion. In partial illustration II, the molding tool 26 has been brought to the second or third temperature, the compensating body 32 already being significantly expanded.

FIG. 3C shows a detail of the molding tool 26, the compensating body 32, the semifinished fiber product 38, and the tool surface 28. This surface is visible at the first temperature in the form of a gap 46. The gap 46 will also occur after cooling and facilitate the removal of the finished component from the molding tool 26. At least during the third temperature, but optionally also during the second temperature, the compensating body 32 could be expanded to such an extent that the gap 46 is closed and thus dimensional accuracy of the semifinished fiber product 38 is made easier.

In addition, it should be noted that "having" does not exclude other elements or steps and "a" or "an" does not exclude a multiplicity. Furthermore, it should be noted that features which have been described with reference to one of the above example embodiments can also be used in combination with other features of other example embodiments described above. Reference signs in the claims are not to be regarded as a restriction.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 method
4 providing
6 positioning
8 arranging
10 sealing
12 heating (to a second temperature)
14 introducing
16 curing
18 cooling
20 removing
22 heating (to a third temperature)
24 tool system
26 molding tool
28 tool surface
30 peripheral edge
32 compensating body
34 closure device
36 heating device
38 semifinished fiber product
40 peripheral contour
42 mold
44 resin inlet
46 gap

The invention claimed is:

1. A method for producing a component from a fiber-reinforced plastic, comprising:
    providing a molding tool with a tool surface having a peripheral edge;
    positioning at least one ply of a semifinished fiber product, having a peripheral contour which lies within the peripheral edge, on the tool surface at a first temperature;
    arranging a compensating body, having a coefficient of thermal expansion which is greater than a coefficient of thermal expansion of the molding tool, along the peripheral edge, such that the compensating body extends from the edge in a direction of the peripheral contour;
    sealing an arrangement of the at least one ply and of the compensating body by a closure device to form a closed mold;
    heating the mold, such that the compensating body expands to a greater extent than the mold;
    introducing resin into the mold; and
    curing, cooling, and removing the component;
    wherein the compensating body is narrower at longitudinal edges than at transverse edges of the molding tool before being arranged on the molding tool.

2. The method of claim 1, wherein heating the mold comprises:
    heating the mold from the first temperature to a second temperature at which the compensating body expands to an extent that exceeds expansion of the mold by an amount such that the compensating body partially fills an interspace formed between the peripheral contour and the peripheral edge; and
    wherein curing the component comprises:
        heating the mold from the second temperature to a limit temperature at which the resin initiates crosslinking in the semifinished fiber product and the compensating body further expands to an extent that exceeds further expansion of the mold such that the compensating body exactly fills the interspace; and
        heating the mold from the limit temperature to a third temperature at which curing of the resin is completed.

3. The method of claim 2, wherein the second temperature is in a range of from 70° C. to 150° C.

4. The method of claim 3, wherein the third temperature is in a range of from 150° C. to 220° C.

5. The method of claim 1, wherein the molding tool has a coefficient of thermal expansion of at most $30 \cdot 10^{-6}$ K$^{-1}$, and the compensating body has a coefficient of thermal expansion of at least $100 \cdot 10^{-6}$ K$^{-1}$.

* * * * *